United States Patent
Shimizu et al.

(10) Patent No.: US 12,507,904 B2
(45) Date of Patent: Dec. 30, 2025

(54) BIOLOGICAL DETECTION SYSTEM, BIOLOGICAL DETECTION METHOD, AND PROGRAM

(71) Applicant: The University of Electro-Communications, Tokyo (JP)

(72) Inventors: Miku Shimizu, Tokyo (JP); Tota Mizuno, Tokyo (JP); Naoaki Itakura, Tokyo (JP)

(73) Assignee: THE UNIVERSITY OF ELECTRO-COMMUNICATIONS, Tokyo (JP)

( * ) Notice: Subject to any disclaimer, the term of this patent is extended or adjusted under 35 U.S.C. 154(b) by 24 days.

(21) Appl. No.: 18/710,833

(22) PCT Filed: Nov. 18, 2022

(86) PCT No.: PCT/JP2022/042897
§ 371 (c)(1),
(2) Date: Jul. 17, 2024

(87) PCT Pub. No.: WO2023/090429
PCT Pub. Date: May 25, 2023

(65) Prior Publication Data
US 2025/0040821 A1    Feb. 6, 2025

(30) Foreign Application Priority Data
Nov. 19, 2021 (JP) ................................. 2021-188255

(51) Int. Cl.
*A61B 5/026* (2006.01)
*A61B 5/00* (2006.01)

(52) U.S. Cl.
CPC .......... *A61B 5/0261* (2013.01); *A61B 5/4035* (2013.01)

(58) Field of Classification Search
None
See application file for complete search history.

(56) References Cited

U.S. PATENT DOCUMENTS

2017/0156673 A1\* 6/2017 Uchida ................ G06V 10/141
2018/0168451 A1\* 6/2018 Arai ..................... A61B 5/0075
(Continued)

FOREIGN PATENT DOCUMENTS

JP      2017000773 A    1/2017
JP      2018055231 A    4/2018
(Continued)

OTHER PUBLICATIONS

International Search Report dated Dec. 27, 2022 filed in PCT/JP2022/042897.

*Primary Examiner* — Yi-Shan Yang
(74) *Attorney, Agent, or Firm* — Rankin, Hill & Clark LLP

(57) ABSTRACT

Included are: an averaging processing unit configured to acquire video data of a facial image captured of a face of a target person and average all pixels in a specific region of the acquired video data, at regular time intervals, in terms of a difference component between color components of primary colors in the specific region; a fluctuation acquisition unit configured to obtain a fluctuation in each of the color components of the primary colors averaged by the averaging processing unit; and a detection unit configured to detect a blood flow or an activity based on the blood flow on the basis of an amount of fluctuation obtained by the fluctuation acquisition unit. This makes it possible to easily, in a non-contact manner, highly accurately detect the blood flow and detect an activity such as an autonomic nervous activity without preparing a special device.

5 Claims, 13 Drawing Sheets

(56) References Cited

U.S. PATENT DOCUMENTS

2021/0068678 A1\*  3/2021  Ogawa ................ A61B 5/0022
2021/0287697 A1   9/2021  Marti et al.
2023/0397826 A1\* 12/2023  Park .................. A61B 5/02416

FOREIGN PATENT DOCUMENTS

JP         2021058361 A  *  4/2021
JP         2021146214 A      9/2021

\* cited by examiner

BIOLOGICAL DETECTION SYSTEM, BIOLOGICAL DETECTION METHOD, AND PROGRAM

TECHNICAL FIELD

The present invention relates to a biometric detection system, a biometric detection method, and a program that detect a biometric condition such as an autonomic nervous activity of a target person in a non-contact manner.

BACKGROUND ART

In recent years, there is a growing need for emotion estimation in order for people to live a more comfortable life, for example, striving to improve working environments by measuring the degrees of fatigue and focus of employees at their workplace and encouraging the employees to take appropriate breaks. In measuring the degree of fatigue and focus, various methods have been studied in which biometric information such as heart rate, pulse wave, brain wave, eye movement, or a thermal facial image is acquired to estimate an emotion. In particular, the method using a thermal facial image allows making an estimation using a far-infrared camera that is a non-contact apparatus in contrast to other methods. Therefore, it is possible to perform a measurement without a test subject (target person) feeling stress and without restricting the movements of the test subject. Hence, it is considered as a useful method.

Patent Literature 1 describes a technology for acquiring the emotion of a vehicle operator using, for example, a thermal image as a driver monitoring system.

CITATION LIST

Patent Literature

Patent Literature 1: JP-A-2021-146214

SUMMARY OF INVENTION

Problems to be Solved by Invention

In the known emotion estimation using a thermal facial image, an autonomic nervous activity is estimated by taking a difference in temperature between the nose part, which serves as an indicator of the sympathetic nerve of the autonomic nervous activity, and the forehead part, which is hardly affected by the autonomic nervous activity. Skin temperature is the antagonistic temperature between the conduction heat of core body temperature and a change in the volume of blood flow under the skin, and environmental temperature. From the above, it is configured in such a manner that only a change in the volume of blood flow in the periphery flowing under the skin of the nose part excluding a change in external temperature and the core body temperature is acquired by taking a difference in temperature between the nose part and the forehead part.

Here, when an unpleasant stimulus is given, the temperature of the nose part decreases and the temperature of the mouth part increases. However, even when an unpleasant stimulus is given, the average temperature of the entire face does not change very much. Therefore, it is known that it is possible to estimate "pleasant or unpleasant" from a change in the volume of blood flow in the periphery flowing under the skin of the nose part, with the variance of a thermal facial image as an indicator, on the basis of a change in temperature distribution caused by a change in emotion.

However, such a known method requires a far-infrared camera to acquire a thermal image, and has problems that it is difficult to easily detect an autonomic nervous activity with an existing system and that it needs a cost for preparing the far-infrared camera.

Moreover, the problems in the case of detecting an autonomic nervous activity were mentioned here. However, it is difficult to accurately detect the blood flow in a facial image in the first place.

An object of the present invention is to provide an autonomic nervous activity detection system, an autonomic nervous activity detection method, and a program that can detect a biometric condition such as an autonomic nervous activity easily, in a non-contact manner, and accurately without preparing a special device.

Solution to Problems

A biometric detection system according to the present invention includes: an averaging processing unit configured to acquire video data of a facial image captured of the face of a target person and average all pixels in a specific region of the acquired video data, at regular time intervals, in terms of color components of primary colors in the specific region; a fluctuation acquisition unit configured to obtain a fluctuation in each of the color components of the primary colors averaged by the averaging processing unit; and a detection unit configured to detect a blood flow or an activity based on the blood flow on the basis of the amount of fluctuation obtained by the fluctuation acquisition unit.

Moreover, a biometric detection method according to the present invention is a biometric detection method in which an information processing apparatus performs a computing process on the basis of video data of a facial image captured of the face of a target person and detects a blood flow of the target person or an activity based on the blood flow.

In addition, the computing process performed by the information processing apparatus includes: an averaging process of averaging all pixels in a specific region of the video data captured of the face of the target person, at regular time intervals, in terms of a difference component between color components of primary colors in the specific region; a fluctuation acquisition process of obtaining a fluctuation in the difference component between the color components of the primary colors averaged in the averaging process; and a detection process of detecting a blood flow or an activity based on the blood flow on the basis of the amount of fluctuation obtained in the fluctuation acquisition process.

Moreover, a program according to the present invention causes a computer to execute each of the processes of the above-mentioned biometric detection method as a procedure.

According to these aspects of the present invention, a process is performed in which the blood flow in blood vessels in a specific place or an activity based on the blood flow is detected accurately on the basis of a video captured of the face.

DESCRIPTION OF EMBODIMENTS

An embodiment of the present invention (hereinafter referred to as the "embodiment") is described hereinafter with reference to the accompanying drawings.

[System Configuration]

Figure 1:
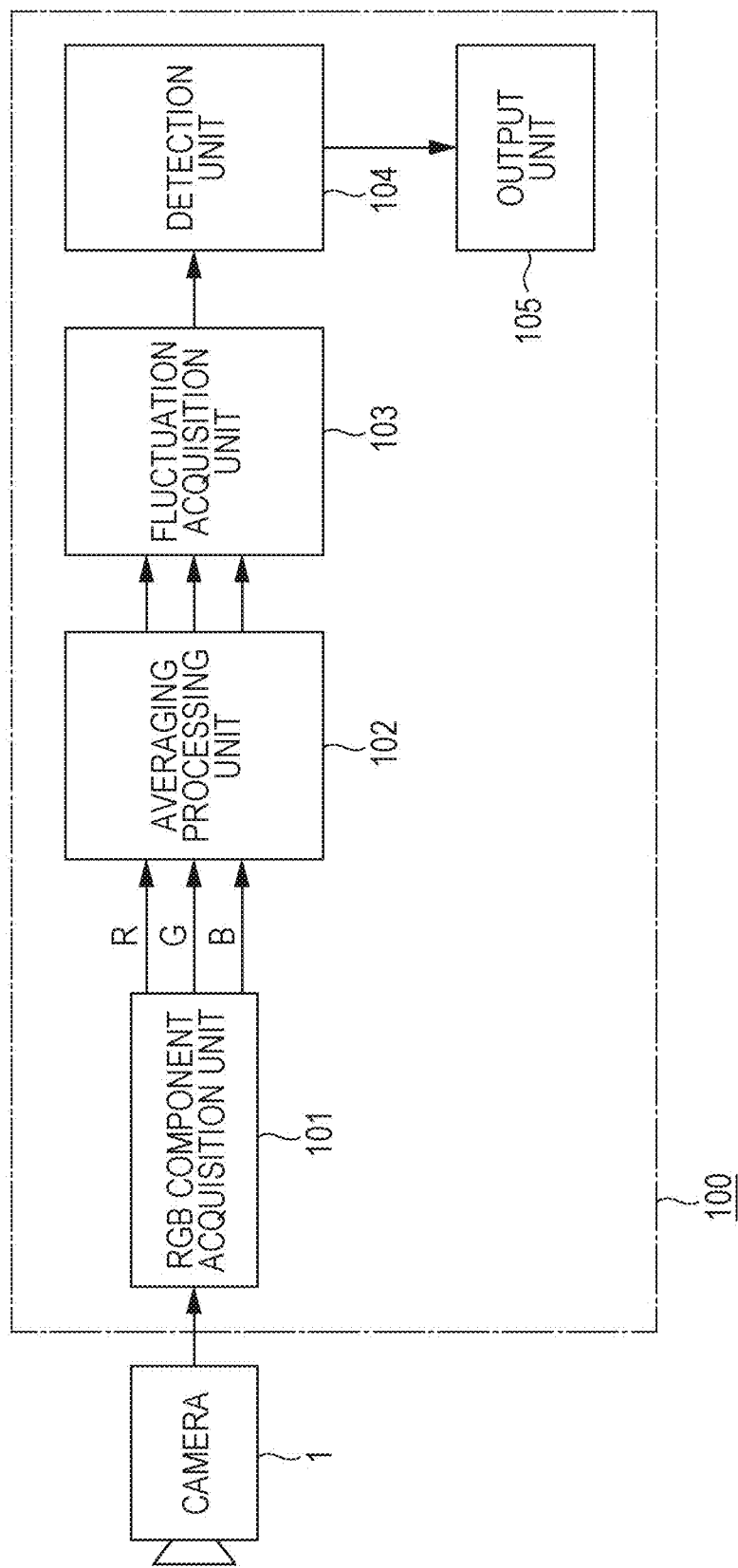
FIG. 1 is a configuration diagram illustrating an example of a biometric detection system according to an embodiment of the present invention.

FIG. 1 is a function block diagram illustrating a configuration for processes that are performed by an autonomic nervous activity detection system 100 according to the embodiment.

The autonomic nervous activity detection system 100 of the embodiment takes in image data captured by a camera 1. The image data is captured of the face of a target person whose pulse wave is to be detected. The image data captured by the camera 1 is video data at a constant frame rate, and image data of each frame includes pixel data of primary colors, red (R), green (G), and blue (B). The frame rate of the image data is, for example, 30 frames/second, and each pixel in each frame presents the luminance value of red (R), green (G), or blue (B) in a predetermined grayscale.

The image data taken in by the autonomic nervous activity detection system 100 is supplied to an RGB component acquisition unit 101, and each of a red component, a green component, and a blue component is individually acquired. The each of the red component, the green component, and the blue component, which have been obtained by the RGB component acquisition unit 101, is supplied to an averaging processing unit 102.

The averaging processing unit 102 performs, on a specific region of the acquired video data, an averaging process that averages all pixels of the color components of the primary colors in the specific region at regular time intervals. Here, the specific region of the video data is a nose region. Note that the nose region is taken as an example of the specific region of the video data, and another region is also acceptable as long as it is a region where the skin and the subcutaneous fat are thin and it is easy to recognize a change in blood flow.

Moreover, (R−B) components, each of which is a difference between the red (R) component and the blue (B) component, are obtained as the color components, and the (R−B) components in the nose region are averaged (smoothed) in all the pixels in the region at regular time intervals. The regular time intervals for averaging are preferably selected from approximately five seconds to one minute. For example, the averaging processing unit 102 performs averaging every 20 seconds or every one minute.

Moreover, when averaging the (R−B) components, the averaging processing unit 102 takes out only a stable region having a small change in the amount of light, and performs averaging on the stable place having a small change in the amount of light. The process of taking out only a stable region having a small change in the amount of light is described below in FIGS. 5 to 8.

The averaging result by the averaging processing unit 102 is then supplied to a fluctuation acquisition unit 103, and the fluctuation acquisition unit 103 performs a fluctuation acquisition process on the averaging result.

The fluctuation acquisition unit 103 acquires a pattern of fluctuations in the average values at regular time intervals. Specifically, a fluctuation pattern such as a state in which the average values at regular time intervals are substantially unchanged, a state in which the average value increases, or a state in which the average value decreases is acquired.

Information on the fluctuation pattern acquired by the fluctuation acquisition unit 103 is supplied to a detection unit 104.

A detection unit 104 performs a detection process on a stress state of the target person on the basis of the information on the fluctuation pattern. The detection result (evaluation result) of the stress state detected by the detection unit 104 is outputted from an output unit 105.

[Example of Hardware Configuration of Autonomic Nervous Activity Detection System]

Figure 2:
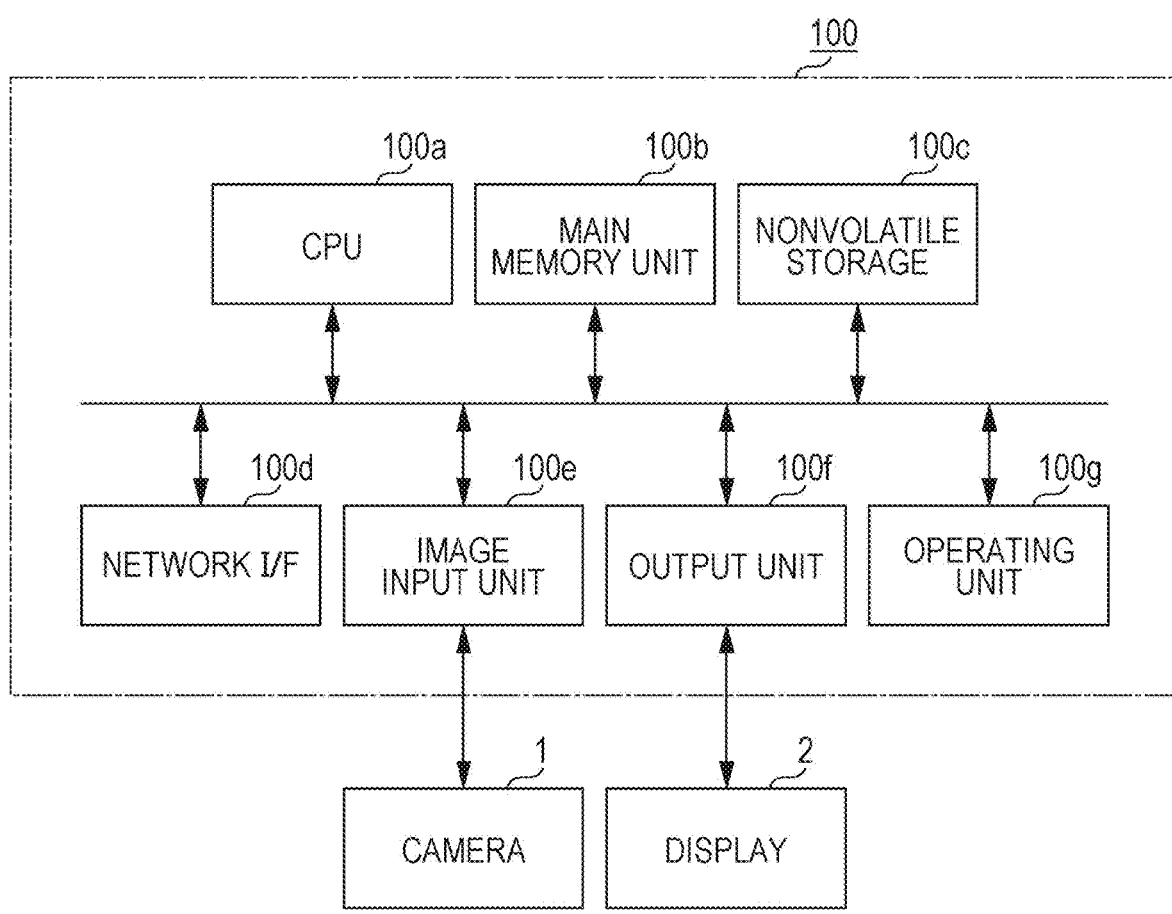
FIG. 2 is a block diagram illustrating an example of a hardware configuration in a case where the biometric detection system according to the embodiment of the present invention is configured of a computer.

FIG. 2 illustrates an example of a hardware configuration in a case where the autonomic nervous activity detection system 100 is configured of a computer that is an information processing apparatus.

The computer (the autonomic nervous activity detection system 100) illustrated in FIG. 2 includes a CPU (Central Processing Unit) 100$a$, a main memory unit 100$b$, a nonvolatile storage 100$c$, a network interface 100$d$, an image input unit 100$e$, an output unit 100$f$, and an operating unit 100$g$, which are each connected to a bus.

The CPU 100$a$ is a processing unit that reads program code of software that achieves functions to be performed by the autonomic nervous activity detection system 100, from the main memory unit 100$b$ or the nonvolatile storage 100$c$, and executes the program code.

The CPU 100a reads the program code from the main memory unit 100b or the nonvolatile storage 100c and executes a computing process in a work area of the main memory unit 100b. Therefore, various processing function units are configured in the main memory unit 100b. For example, the RGB component acquisition unit 101, the averaging processing unit 102, the fluctuation acquisition unit 103, and the detection unit 104, which are illustrated in FIG. 1, are configured in the main memory unit 100b.

A large-capacity information storage medium such as a hard disk drive (HDD), a solid state drive (SSD), or a memory card is used as the nonvolatile storage 100c. The nonvolatile storage 100c stores the software that achieves the functions of the autonomic nervous activity detection system 100 and data obtained by executing a program thereof.

For example, a network interface card (NIC) is used as the network interface 100d, and the network interface 100d transmits and receives data to and from another apparatus.

The image input unit 100e performs an input process (image acquisition process) on image data from the camera 1.

A display 2 is connected to the output unit 100f, and data of, for example, an image representing an autonomic nervous activity detection result such as a stress evaluation result is outputted from the output unit 100f. These detection result and evaluation result are then displayed on the display 2. Note that the detection result and the evaluation result may be transmitted to an external device via the network interface 100d.

The operating unit 100g accepts an operation of a device such as a keyboard or a mouse that is operated by an operator of the computer.

[Flow of Autonomic Nervous Activity Detection Process]

Figure 3:
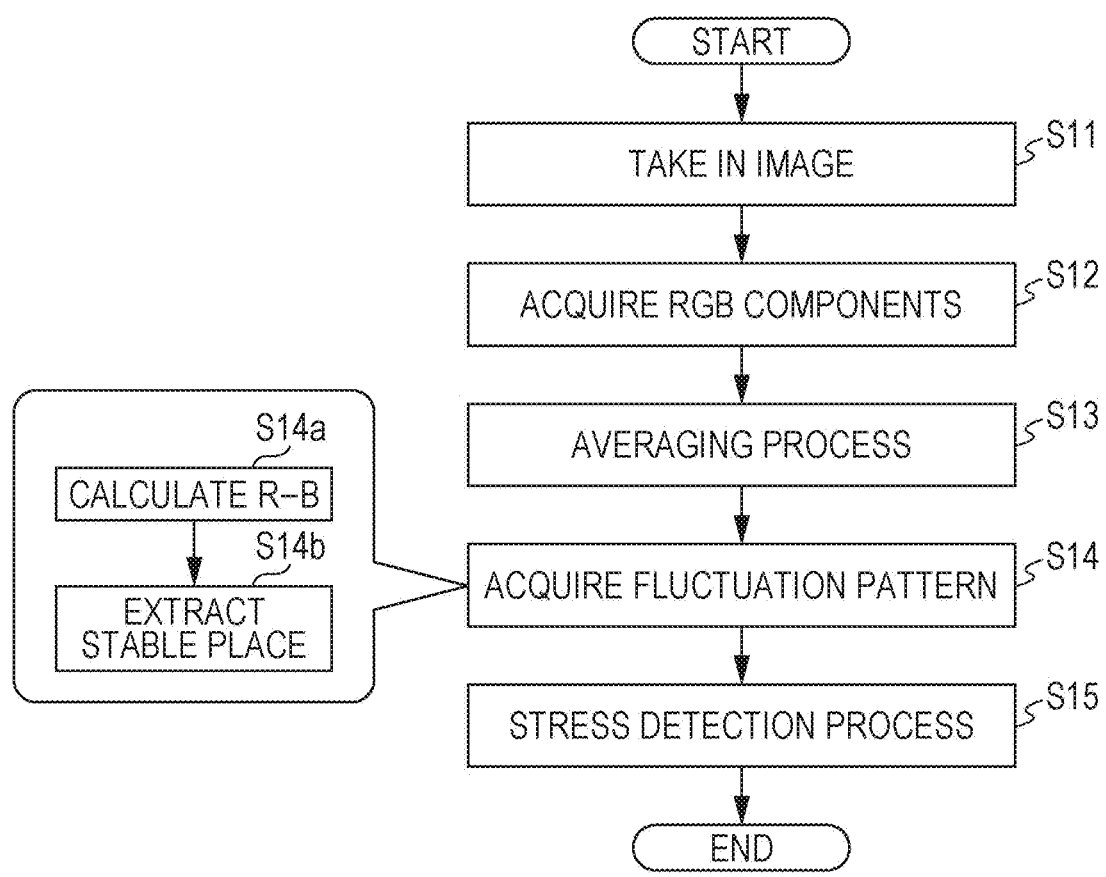
FIG. 3 is a flowchart illustrating the flow of a biometric detection process according to the embodiment of the present invention.

FIG. 3 is a flowchart illustrating the flow of an autonomic nervous activity detection process that is performed by the autonomic nervous activity detection system 100 of the embodiment with the configuration illustrated in FIG. 1.

Firstly, the image input unit 100e (FIG. 2) of the autonomic nervous activity detection system 100 takes in facial image data of a target person captured by the camera 1 (step S1).

The RGB component acquisition unit 101 then acquires the same image data of each of the primary colors, red (R), green (G), and blue (B), individually (step S12).

The color component of the each of the primary colors in the same image data obtained by the RGB component acquisition unit 101 is supplied to the averaging processing unit 102, and in terms of the specific region, the averaging process that averages all pixels of the color components of the primary colors is performed at regular time intervals on the nose region being the specific region (step S13).

In other words, the averaging process is performed on the nose region being the specific region in the video. Here, a process is performed in which (R−B) components, each of which is a difference taken between the red (R) component and the blue (B) component, are obtained as the color components and the (R−B) components of all the pixels in the region are averaged at regular time intervals (for example, every 20 seconds, or every one minute).

On the basis of an averaging result by the averaging processing unit 102, the fluctuation acquisition unit 103 then performs the fluctuation acquisition process on the averaging result at regular time intervals (step S14). In step S14, the fluctuation acquisition unit 103 acquires a fluctuation pattern such as a state in which the average values at regular time intervals are substantially unchanged, a state in which the average value increases, or a state in which the average value decreases. Here, the fluctuation pattern is acquired on the basis of the average value obtained by taking out the (R−B) components (step S14a), and taking out only the stable place having a small influence of a change in the amount of light (step S14b). Note that taking out the (R−B) components and taking out only the stable place may be performed in the averaging process.

Furthermore, the detection unit 104 performs a stress detection process on the target person on the basis of information on the fluctuation pattern acquired by the fluctuation acquisition unit 103 (step S15). The stress detection result (evaluation result) obtained by the detection unit 104 is outputted from the output unit 105.

[Description of Processes for Detecting Autonomic Nervous Activity]

Figure 4:
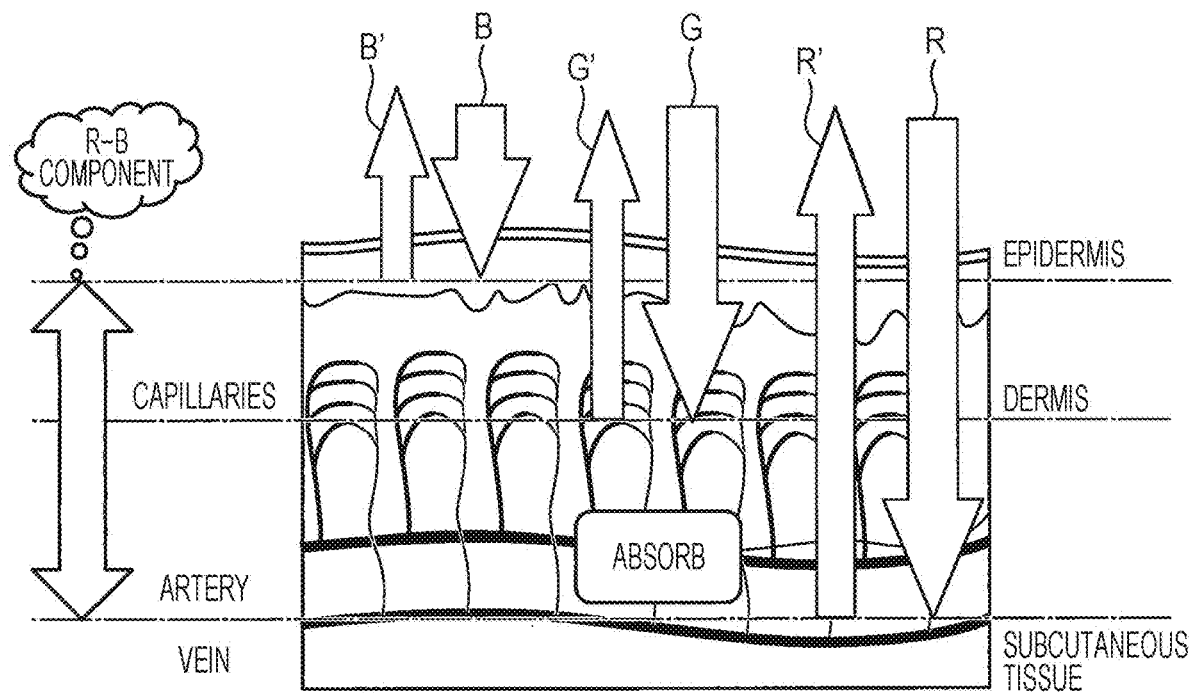
FIG. 4 is a diagram explaining the estimation of an autonomic nervous activity through the subcutaneous structure according to the embodiment of the present invention.

FIG. 4 is a diagram explaining a difference in the penetration depth of the wavelength of the each of the primary colors into human skin.

As illustrated in FIG. 4, the descending order of the penetration depth into the skin is the red (R) component, the green (G) component, and the blue (B) component. In other words, in terms of the blue component, light reflected by the epidermis of the skin is seized as the image captured by the camera 1. Moreover, in terms of the green component, light reflected by the dermis deeper than the epidermis is seized as the image captured by the camera 1. Capillaries are placed at the depth of the dermis.

Furthermore, in terms of the red component, light reflected in the place of the subcutaneous tissue deeper than the dermis is seized as the image captured by the camera 1. Arteries and veins are placed in the place of the subcutaneous tissue.

Here, the averaging processing unit 102 of the embodiment is configured in such a manner as to obtain the (R−B) components each being a difference taken between the red (R) component and the blue (B) component. Therefore, it is considered that the (R−B) components include information on a view of all the blood vessels excluding luminance components.

Note that if it is configured in such a manner as to obtain (G−B) components each being a difference taken between the green (G) component and the blue (B) component, it is considered that information on a view of all the capillaries excluding luminance components is included. In the following description, an example is described in which the (R−B) components are acquired to acquire information on a view of all the blood vessels. However, it is also possible to acquire the (G−B) components, acquire information on a view of all the capillaries, and perform, for example, a stress evaluation. However, as described below, it is preferable to acquire the (R−B) components and acquire information on a view of all the blood vessels.

Therefore, it is considered that the averaging processing unit 102 can acquire information on the volume of blood flow in all the blood vessels by obtaining the (R−B) components.

The autonomic nervous activity detection system 100 of the embodiment is configured in such a manner that the information on the volume of blood flow in all the blood vessels is acquired in this manner, and an autonomic nervous activity of the target person (test subject) is estimated (detected) from a change in the volume of blood flow.

Note that in more detailed description of the point of acquiring the volume of blood flow in the blood vessels, it is considered that light that has entered deep into the skin is absorbed in the blood through the blood vessels, and a part of the light that has not been absorbed appears as reflected light on the surface of the face. Therefore, assuming that the value of each color component obtained from an actual image captured is the amount of the reflected light, it is necessary to find the degree of absorption into the blood. Note that a component that absorbs light in the blood is considered to be hemoglobin. On the basis of this idea, a characteristic of the blood that absorbs more light can be grasped from hemoglobin's absorptivity of light of each color.

For example, in a range of 610 nm to 780 nm, which is the wavelength of red light, deoxyhemoglobin (Hb) has a higher absorptivity than oxyhemoglobin (HbO2). Therefore, when the volume of artery-derived blood is large, the red incident light is not absorbed very much, and the amount of the reflected light increases. On the other hand, when the volume of vein-derived blood flow is large, the absorption increases, and the reflected light decreases.

Moreover, in a range of 500 nm to 570 nm, which is the wavelength of green light, both oxyhemoglobin and deoxyhemoglobin have substantially the same absorptivity. In terms of the capillaries, it is considered that not the ratio of the volume of artery-derived blood flow and the volume of vein-derived blood flow but the volume of blood flow through all the capillaries is measured. It is considered that when the volume of blood flow in the capillaries increases, the amount of absorption of green incident light increases and the amount of reflection decreases, and conversely, it is considered that when the volume of blood flow in the capillaries decreases, the amount of absorption decreases and the amount of reflection increases.

In a case of the embodiment, it is configured in such a manner that these principles are used to acquire the (R−B) components, detect the volume of blood flow in all the blood vessels, and estimate (detect) an autonomic nervous activity.

Next, a process is described in which the averaging processing unit 102 takes out a region having a small influence of a change in the amount of light in the (R−B) components.

Figure 5:
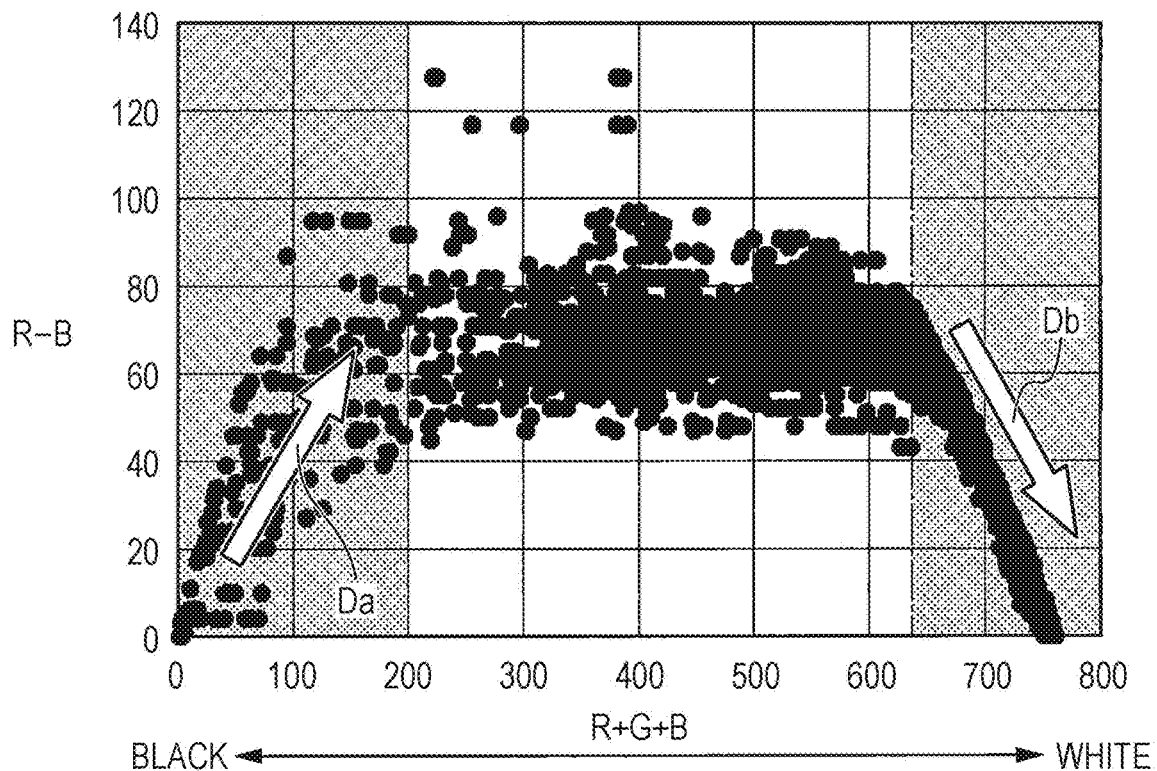
FIG. 5 is a diagram illustrating an example of a detected state (an example of a comparison an R−B component and an R+G+B component) according to the embodiment of the present invention.

FIG. 5 is a diagram illustrating a distribution of the luminance value of each pixel in a nose image of one frame. In FIG. 5, the horizontal axis represents the (R+G+B) component, and the left end of the horizontal axis corresponds to black and the right end corresponds to white. In FIG. 5, the vertical axis represents the (R−B) component. Here is a case where the luminance value of each of the colors R, G, and B is from 0 to 255, and the (R+G+B) component has a value ranging from 0 to 765.

As illustrated in FIG. 5, in a range where the (R+G+B) component is near 0, the distribution of the (R−B) component has a slope indicated with an arrow Da. Similarly, in a range where the (R+G+B) component is near the maximum value (765), the distribution of the (R−B) component has a slope indicated with an arrow Db.

The ranges including the slopes are ranges having many fluctuations due to changes in the amount of light in the image, and are ranges that are not suitable for the processes of the embodiment.

Figure 6:
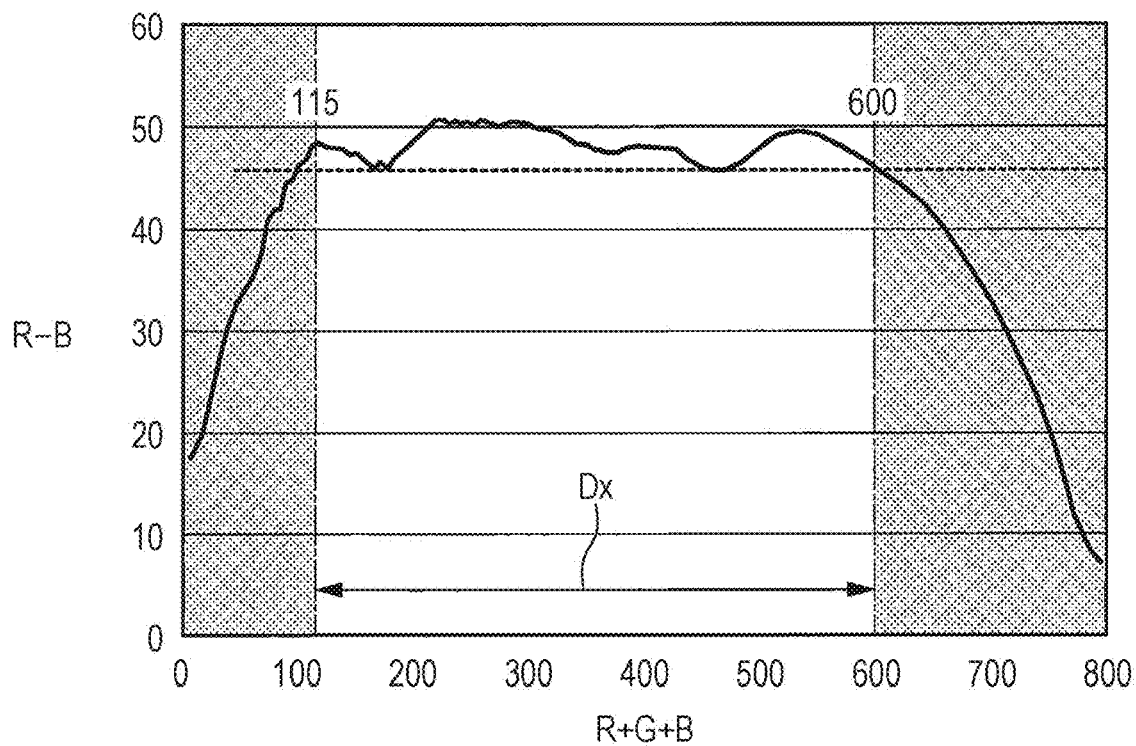
FIG. 6 is a diagram illustrating an example in which a section having a small influence of a change in the amount of light is taken out of the detected state illustrated in FIG. 5.

Therefore, in the case of the embodiment, it is configured in such a manner that, as illustrated in FIG. 6, a middle range Dx having a small influence of a change in the amount of light excluding a specific range near the minimum value of and a specific range near the maximum value of the (R+G+B) component is taken out as the (R−B) component.

In terms of the range Dx, when the (R+G+B) component is set at, for example, 0 to 765, the (R+G+B) component is limited to 115 to 600. However, the values are examples, and it is preferable to impose reasonable limits within the range near the minimum value of and the range near the maximum value of the (R+G+B) component.

Figure 7:
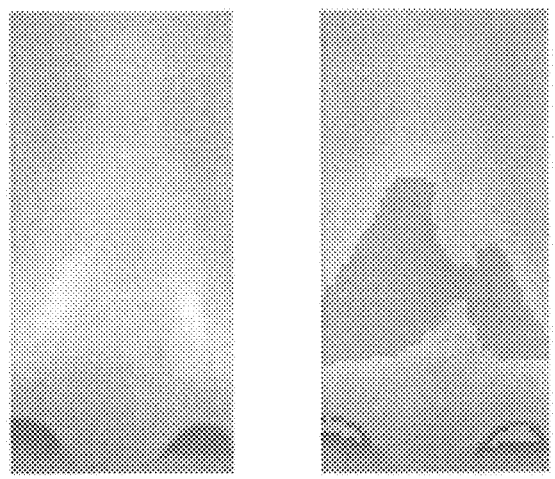
FIG. 7 is a diagram illustrating an unlimited image (left) in the vicinity of the nose and an image (right) obtained by taking out the section having a small influence of a change in the amount of light taken out in the example illustrated in FIG. 6.

FIG. 7 illustrates an example of an image of the nose with limits on the value of the (R+G+B) component.

The left side of FIG. 7 is an example of an image on which no limits are imposed.

The right side of FIG. 7 is an example in which the (R+G+B) component is limited to 115 to 600, and the limited place appears in black.

As can be seen from FIG. 7, the limits allow excluding places shining and shaded due to the influence of, for example, external light and taking out only pixel values suitable for analysis of the processes of the embodiment.

Figure 8:
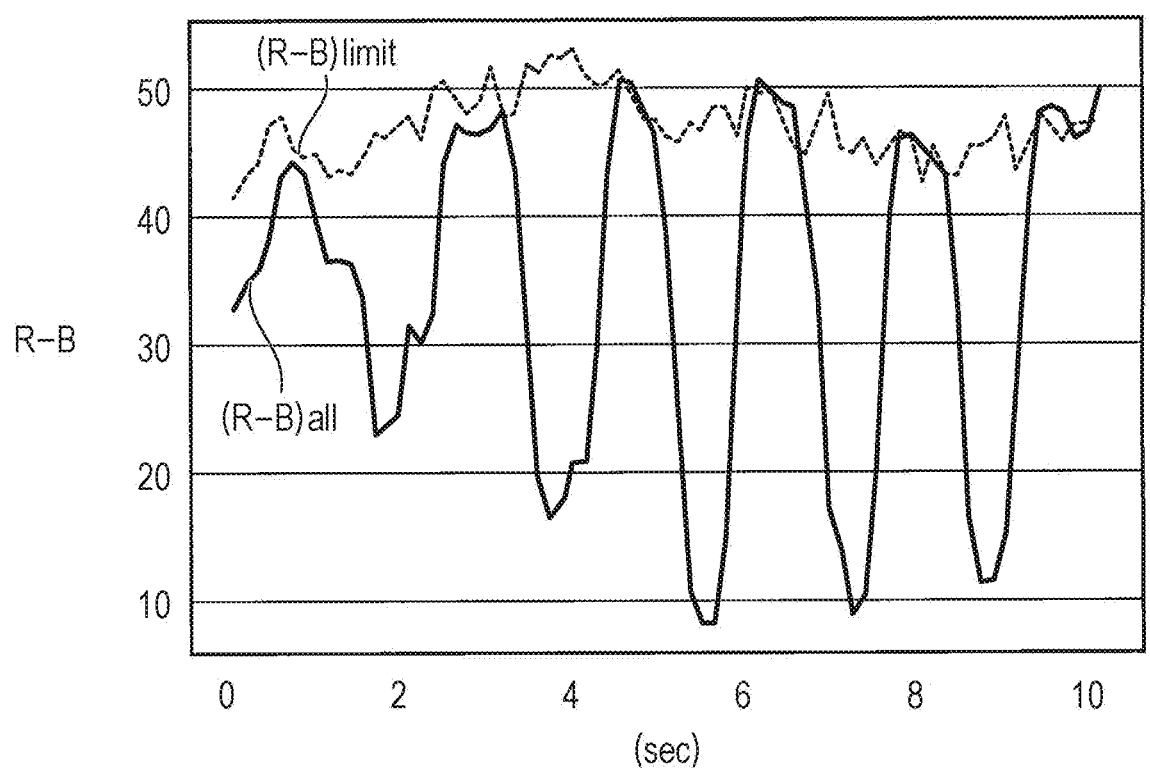
FIG. 8 is a diagram illustrating an example of the pixel value of an unlimited R−B component and the pixel value of a limited R−B component when the head is shaken.

FIG. 8 is a diagram illustrating that the limitation of the embodiment works effectively. In FIG. 8, the horizontal axis represents time (seconds), and the vertical axis represents the value of the (R−B) component.

FIG. 8 illustrates an example of changes in the (R−B) component of the nose part in a state where the test subject shakes the head sideways.

In FIG. 8, a characteristic indicated as $(R-B)_{all}$ is a (R−B) component acquired from all the (R+G+B) components.

Moreover, in FIG. 8, a characteristic indicated as $(R-B)_{limit}$ is a (R−B) component acquired from the (R+G+B) component within a range of 115 to 600.

As illustrated in FIG. 8, the characteristic $(R-B)_{limit}$ had relatively small fluctuations even when the test subject shakes the head sideways and the reflection state of external light changes. On the other hand, in the case of the unlimited characteristic $(R-B)_{all}$, when the test subject shakes the head sideways, there is a large influence of external light, which results in relatively large changes in the (R−B) component.

Therefore, the luminance range limiting process according to the embodiment is performed to allow stable analysis that is not influenced by, for example, external light and shadow.

[Example of why Use of (R−B) Component is Most Preferable]

Note that, in the case of the embodiment, it is configured in such a manner as to perform an analysis using the (R−B) component as a color difference component. A reason why the use of the (R−B) component is the most preferable is described with reference to FIGS. 9 to 11.

Figure 9:
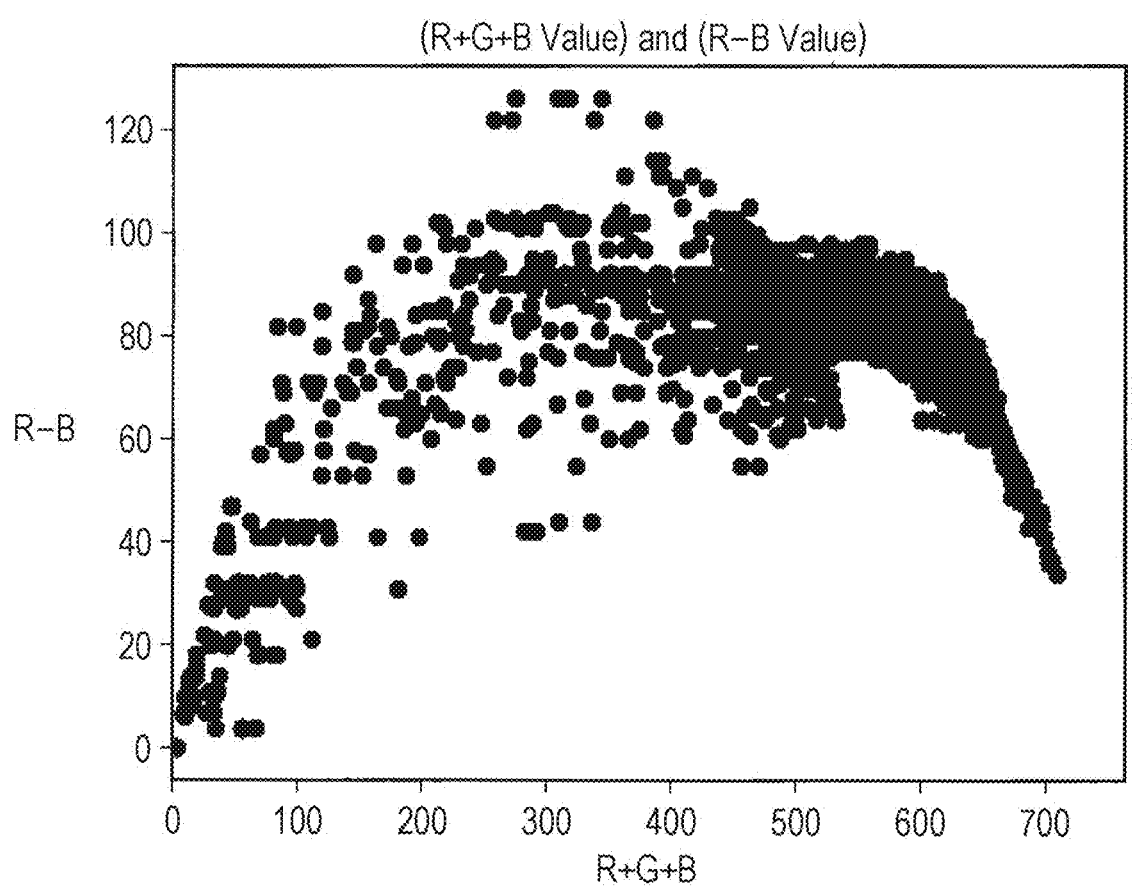
FIG. 9 is a diagram illustrating an R+G+B component and an R−B component that were detected under a certain condition.
Figure 10:
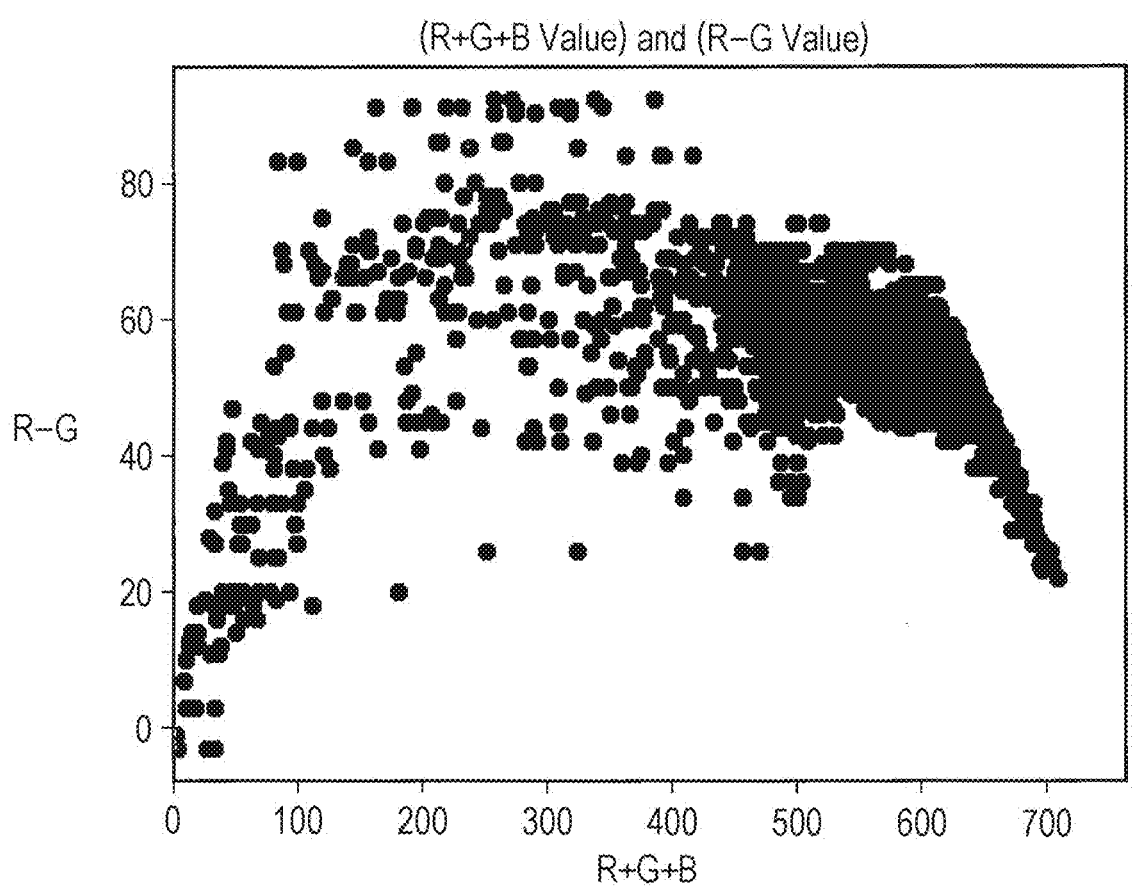
FIG. 10 is a diagram illustrating an R+G+B component and an R−G component that were detected under the same condition as FIG. 9.
Figure 11:
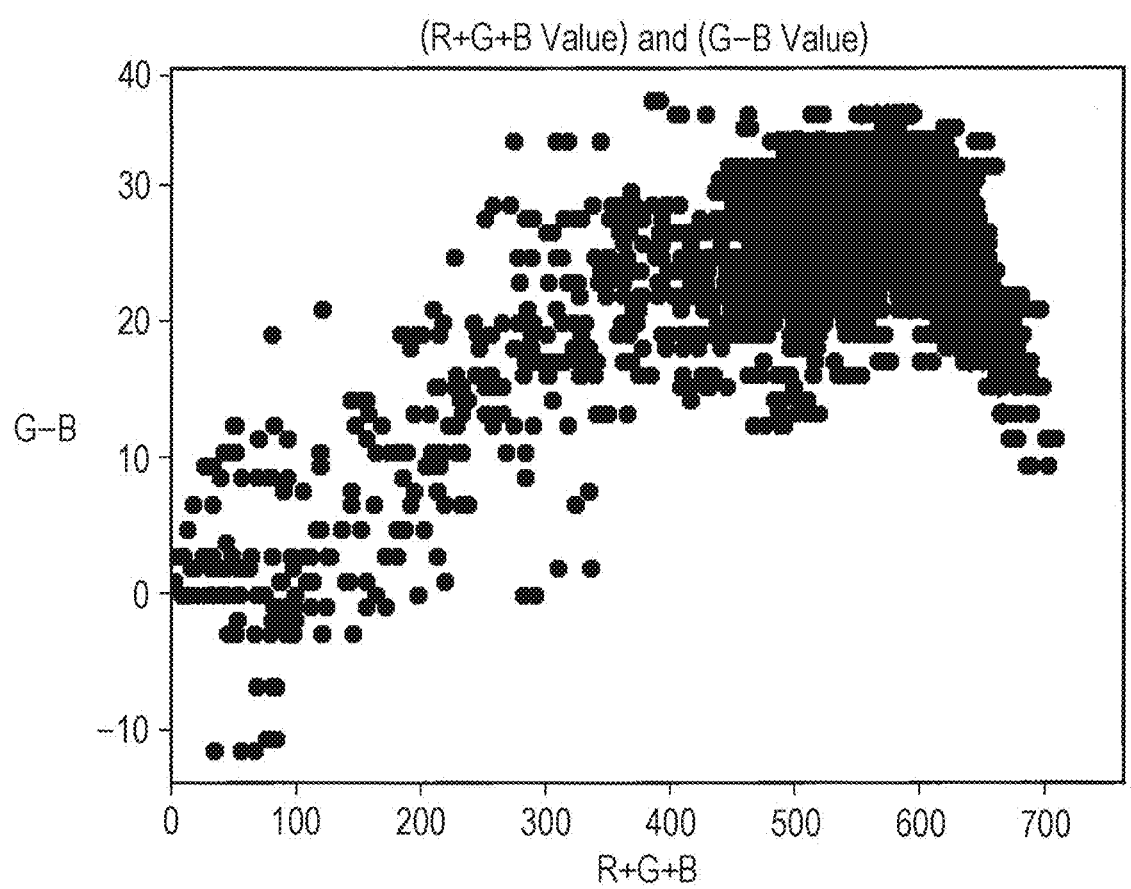
FIG. 11 is a diagram illustrating an R+G+B component and a G−B component that were detected under the same condition as FIG. 9.

FIGS. 9 to 11 all illustrate the distribution of the same nose image, and the horizontal axis in FIGS. 9 to 11 represents the (R+G+B) component. Moreover, the vertical axis in FIG. 9 represents the (R−B) component, the vertical axis in FIG. 10 represents a (R−G) component, and the vertical axis in FIG. 11 represents the (G−B) component.

As can be seen from comparisons of FIGS. 9 to 11, the (R−B) component illustrated in FIG. 9 falls within a substantially certain area, and can be said to be a signal component suitable for analysis.

On the other hand, in terms of the (R−G) component illustrated in FIG. 10, the value of each pixel spreads in a wider area than the example of FIG. 9, and it is shown that the accuracy of the analysis result is slightly lower than the component of FIG. 9.

Furthermore, in the case of the (G−B) component illustrated in FIG. 11, the value of each pixel spreads in a wider area than the examples of FIGS. 9 and 10, and it is shown that the accuracy of the analysis result is much lower than the other cases.

Figure 12:
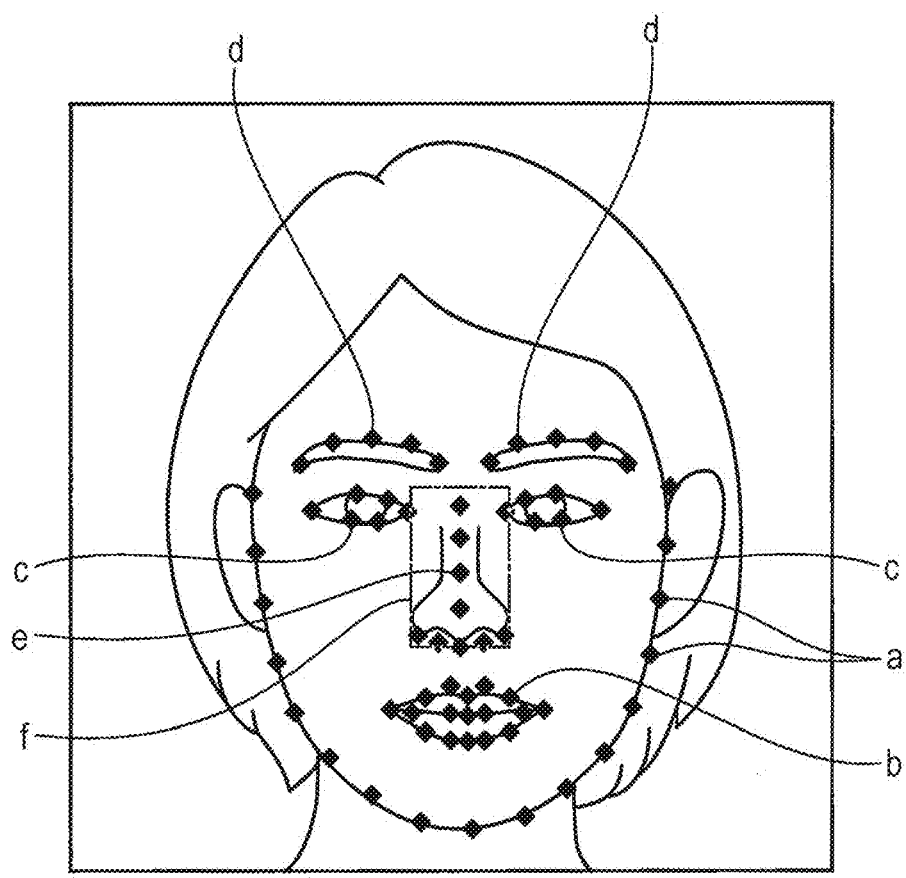
FIG. 12 is a diagram illustrating an example of detection of landmarks in a facial image according to the embodiment of the present invention.

FIG. 12 is a diagram for explaining a process in which the averaging processing unit 102 extracts the nose region, which is the specific region, from a facial image.

When having acquired a facial image of each frame, the averaging processing unit 102 sets a plurality of landmarks a indicating the contour position of the cheeks of the face, a plurality of landmarks b indicating the position of the lip, a plurality of landmarks c indicating the positions of the eyes, a plurality of landmarks d indicating the positions of the eyebrows, and a plurality of landmarks e indicating the position of the nose, as illustrated in FIG. 5, on the basis of facial shape data prepared in advance. The averaging processing unit 102 then determines a nose region f from the positions of the set landmarks a to e, and performs a process of extracting color data of pixels in the nose region f. Furthermore, a process is performed in which the values of all the pixels in the extracted color data of the pixels are set within the range (the range of the data Dx in FIG. 6) excluding the neighborhood of the minimum value and the neighborhood of the maximum value.

Consequently, the averaging processing unit 102 takes out a specific color area of the nose region of the facial image and obtains an average of the (R−B) components, as described above, for the nose region that has been taken out. The averaging processing unit 102 then performs a process of detecting the volume of blood flow in the nose of the face.

Consequently, in the stress detection process by the detection unit 104, stress is detected on the basis of a change in the volume of blood flow.

[Example where Stress Detection was Performed]

Figure 13:
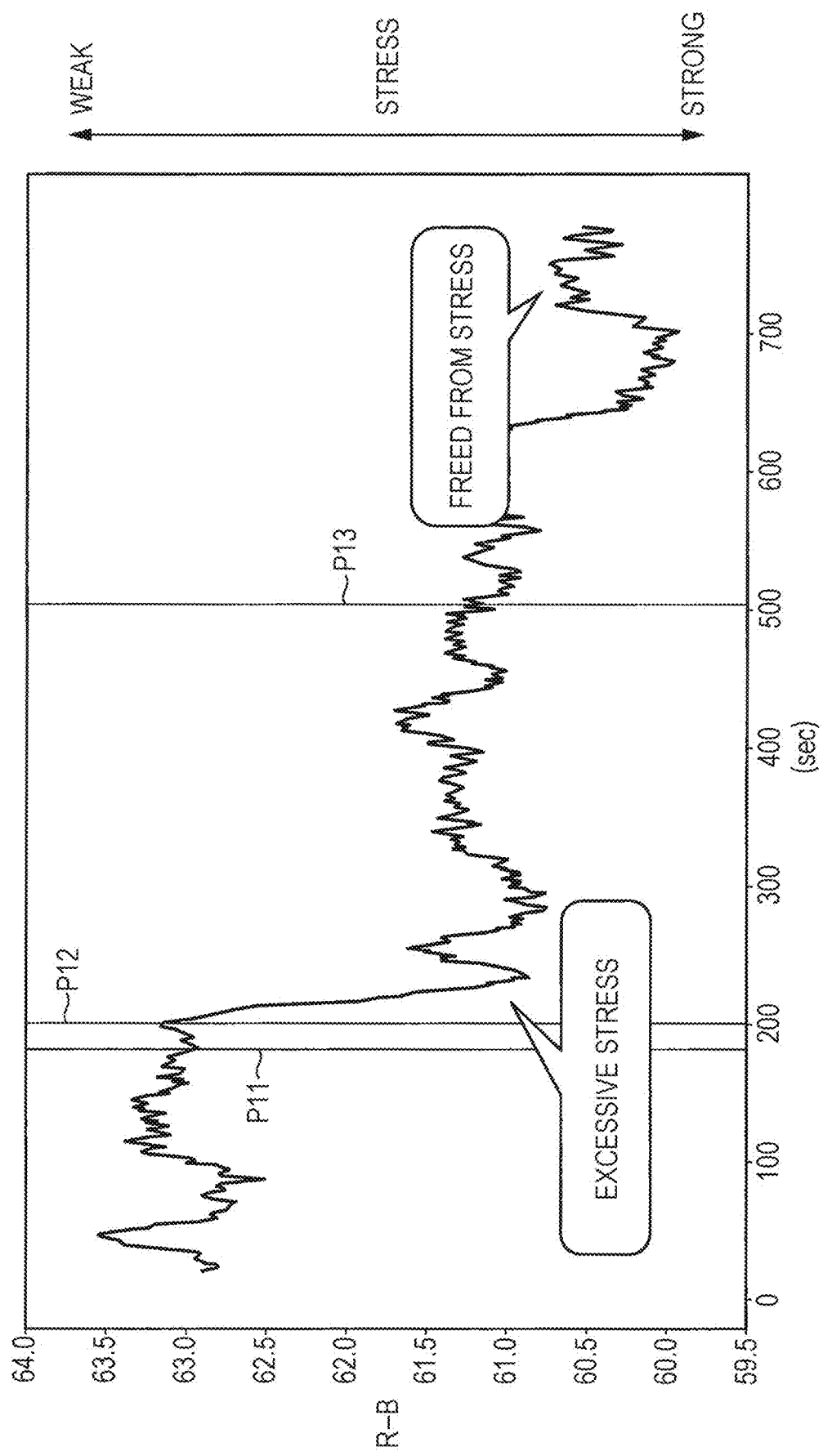
FIG. 13 is a diagram illustrating an analysis result example (Example 1) according to the embodiment of the present invention.
Figure 14:
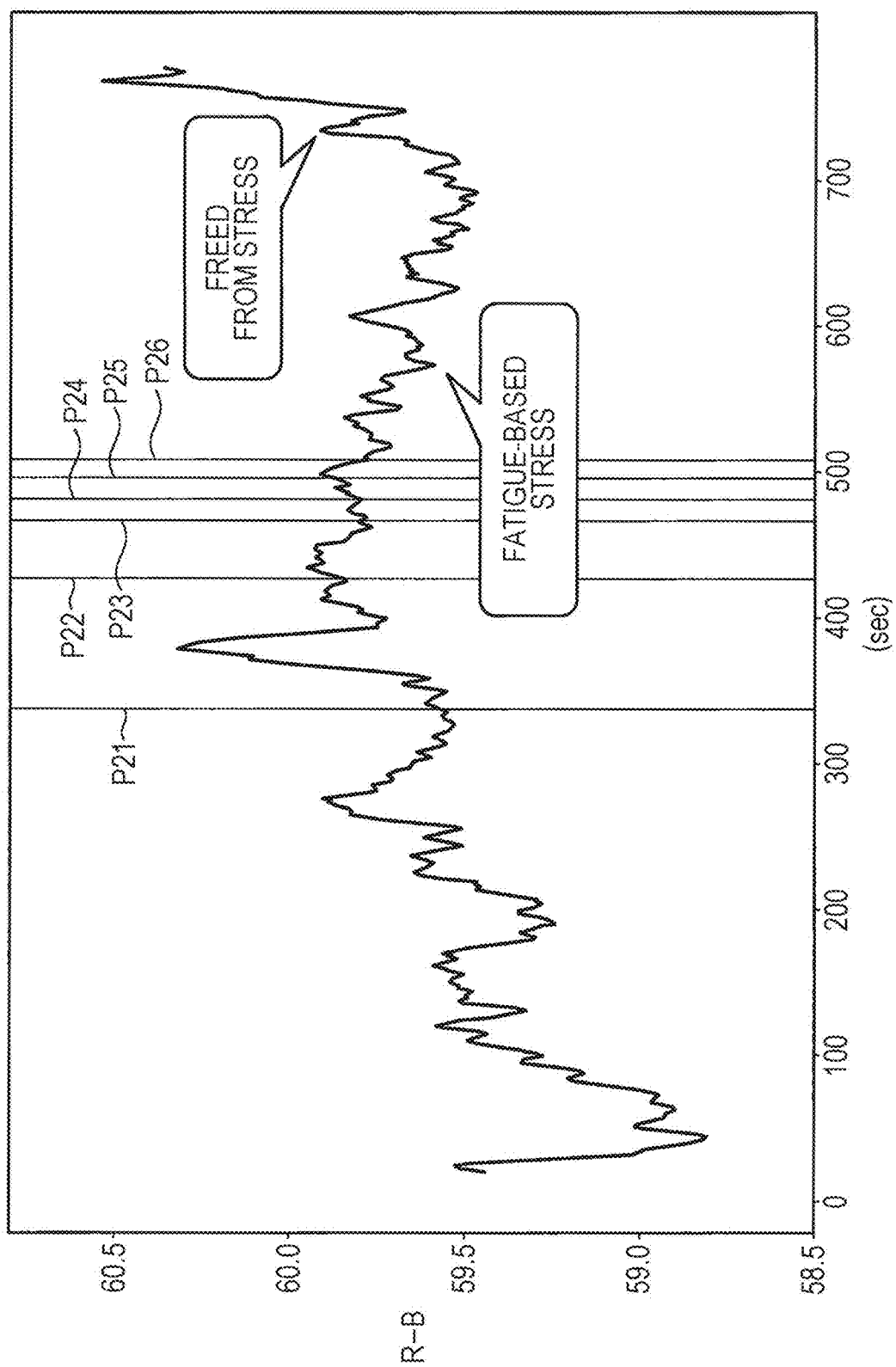
FIG. 14 is a diagram illustrating an analysis result example (Example 2) according to the embodiment of the present invention.

Next, FIGS. 13 and 14 illustrate two examples where stress was actually detected by the autonomic nervous activity detection system 100 of the embodiment. The two examples illustrated in FIGS. 13 and 14 illustrate changes in the detected value (average value) of the volume of blood flow from the start to the end of a task executed in an experiment in which mental calculation questions prepared in advance were solved. In FIGS. 13 and 14, the vertical axis represents the value of the (R−B) component in the nose region obtained by the averaging processing unit 102, and the horizontal axis represents the elapsed time (seconds) from the start of the experiment. Here, it is assumed that the averaging processing unit 102 performed averaging (smoothing) every 20 seconds. FIGS. 13 and 14 illustrate that the larger the value of the detected (R−B) component, the weaker the stress, and the smaller the value of the detected (R−B) component, the stronger the stress.

The example illustrated in FIG. 13 illustrates a situation in which the test subject made a mistake in a mental calculation question at time P11 and the test subject himself/herself noticed the mistake immediately afterward at time P12. Furthermore, a mistake occurred in another mental calculation question also at time P13.

Here, the detected value of the (R−B) component remained high for a while after the start of the experiment, but decreased sharply after time P12 when the mistake was noticed. Therefore, as shown by the detected value, strong stress was applied to the test subject after time P12.

Moreover, it is shown that after the detected value decreased at time P12, the detected value was maintained to some extent in the decreased state, and then later than time P13, the detected value decreased further, and the stress became stronger.

When the mental calculations were finished at a subsequent time (700 seconds), the detected value increased, and it is shown that the stress was freed.

An example illustrated in FIG. 14 represents a case where a test subject was not aware of the occurrence of a mistake until finishing the mental calculation questions.

In this example, mistakes occurred in the mental calculation questions at times P21, P22, P23, P24, P25, and P26. However, since the occurrence of the mistakes was not noticed, there is no correlation between the occurrence of the mistakes and the stress.

In terms of changes in the detected value in the case of the example of FIG. 14, the stress increased after the start of working on the mental calculation questions, and then the detected value increased gradually with the passage of time, and the stress decreased. Thereafter, in the latter half of the mental calculation task after a certain amount of time passed (around 500 seconds), the detected value decreased, and it indicates a state in which fatigue-based stress was being applied.

Also in the case of the example of FIG. 14, when the mental calculations were finished at a subsequent time (700 seconds), the detected value increased, and it is shown that the stress was freed. However, in the case of the example of FIG. 14, it is shown that the degree to which the stress became weaker after the end of the mental calculations is greater than in the example of FIG. 13.

In this manner, according to the autonomic nervous activity detection system 100 of the embodiment, it is possible to accurately detect an autonomic nervous activity such as stress that is applied to a target person. In this case, an image to be detected is image data that is obtained from the primary color signals captured by the normal camera 1. Therefore, special equipment such as a far-infrared camera, which is conventionally required, becomes unnecessary, and there is an effect that an existing system can accurately detect an autonomic nervous activity at low cost.

In addition, the (R−B) component, which is a component that shows the blood flow clearly, is used as a component to be detected, and a region limited to a range not influenced by, for example, external light and shadow in the (R−B) component is used. As a result, an autonomic nervous activity can be detected very accurately.

Moreover, in the above description, the autonomic nervous activity detection system 100 that detects an autonomic nervous activity is used as the system of the embodiment. On the other hand, the system may be a biometric detection system that is configured in such a manner that the detection unit 104 detects the volume of blood flow instead of detecting an autonomic nervous activity and the output unit 105 outputs the state of the detected volume of blood flow (the biometric condition).

Also in the case of the biometric detection system that outputs the state of the volume of blood flow (the biometric condition), it is the same as the autonomic nervous activity detection system 100 in that the (R−B) component being the component that shows the blood flow clearly is used. Consequently, there is a special effect that the state of the blood flow can be detected and outputted more clearly than before.

Moreover, the point of using a nose image to detect the state of the blood flow is also an example, and the blood flow may be detected and analyzed by similar processes from an image of a region, other than the nose, of a living body.

Moreover, although the example is presented in which the autonomic nervous activity detection system 100 illustrated in FIG. 1 is configured as a dedicated system that detects an autonomic nervous activity and the blood flow, the autonomic nervous activity detection system 100 of the embodiment can be configured of, for example, the computer illustrated in FIG. 3. Therefore, a program to be operated as the autonomic nervous activity detection system 100 of the embodiment is incorporated into an information processing apparatus such as a computer or a smartphone. Therefore, it is possible to perform the process of detecting stress in parallel with execution of various processes in, for example, the computer or the smartphone, and to evaluate the stress of a target person such as an employee at any time. The program to be operated as the autonomic nervous activity detection system 100 of the embodiment can be created by executing the processes described in the flowchart of FIG. 3 as procedures. Moreover, this program can be put in a recording medium such as various types of memory, an IC card, an SD card, or an optical disk.

LIST OF REFERENCE SIGNS

1 Camera
2 Display
100 Autonomic nervous activity detection system
100a CPU
100b Main memory unit
100c Nonvolatile storage
100d Network interface
100e Image acquisition unit
100e Image input unit
100f Output unit
100g Operating unit
101 RGB component acquisition unit
102 Averaging processing unit
103 Fluctuation acquisition unit
104 Detection unit
105 Output unit

The invention claimed is:

1. A biometric detection system comprising a processor configured to:
    acquire video data of a facial image captured of a face of a target person;
    obtain, from all pixels in a predetermined region of the acquired video data, a difference component between a light amount of a red component and a light amount of a blue component;
    obtain a predetermined range in a distribution of the difference component with respect to a light amount of an all-primary-color component in the all pixels in the predetermined region of the acquired video data by excluding, from the distribution, a first region in the distribution having a first slope inclined from a minimum value of the light amount of the all-primary-color component, and a second region in the distribution having a second slope inclined toward a maximum value of the light amount of the all-primary-color component;
    perform averaging of the difference component in the predetermined range in the distribution, at a predetermined time interval;
    obtain a fluctuation in the averaged difference component; and
    detect a blood flow or an activity based on the blood flow on a basis of an amount of the obtained fluctuation.

2. The biometric detection system according to claim 1, wherein the activity based on the blood flow is an autonomic nervous activity of the target person.

3. The biometric detection system according to claim 1, wherein the predetermined region of the video data is a nose region of the face.

4. A biometric detection method in which an information processing apparatus performs a computing process on a basis of video data of a facial image captured of a face of a target person and detects a blood flow of the target person or an activity based on the blood flow, wherein
    the computing process performed by the information processing apparatus includes:
    obtaining, from all pixels in a predetermined region of the video data, a difference component between a light amount of a red component and a light amount of a blue component;
    obtaining a predetermined range in a distribution of the difference component with respect to a light amount of an all-primary-color component in the all pixels in the predetermined region of the acquired video data by excluding, from the distribution, a first region in the distribution having a first slope inclined from a minimum value of the light amount of the all-primary-color component, and a second region in the distribution having a second slope inclined toward a maximum value of the light amount of the all-primary-color component;
    performing averaging of the difference component in the predetermined range in the distribution, at a predetermined time interval;
    obtaining a fluctuation in the averaged difference component; and
    detecting the blood flow or the activity based on the blood flow on a basis of an amount of the obtained fluctuation.

5. A nonvolatile storage medium storing a program for detecting a blood flow of a target person or an activity based on the blood flow on a basis of image data captured of a face of the target person, the program being installed on a computer to cause the computer to execute:
    obtaining, from all pixels in a predetermined region of the image data, a difference component between a light amount of a red component and a light amount of a blue component;
    obtaining a predetermined range in a distribution of the difference component with respect to a light amount of an all-primary-color component in the all pixels in the predetermined region of the image data by excluding, from the distribution, a first region in the distribution having a first slope inclined from a minimum value of the light amount of the all-primary-color component, and a second region in the distribution having a second slope inclined toward a maximum value of the light amount of the all-primary-color component;
    performing averaging of the difference component in the predetermined range in the distribution, at a predetermined time interval;
    obtaining a fluctuation in the averaged difference component; and
    detecting the blood flow or the activity based on the blood flow on a basis of an amount of the obtained fluctuation.

* * * * *